US007696989B2

(12) United States Patent
Kida et al.

(10) Patent No.: US 7,696,989 B2
(45) Date of Patent: Apr. 13, 2010

(54) FLAT DISPLAY APPARATUS AND INTEGRATED CIRCUIT

(75) Inventors: Yoshitoshi Kida, Kanagawa (JP); Yoshiharu Nakajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1076 days.

(21) Appl. No.: 10/563,298

(22) PCT Filed: Jul. 6, 2004

(86) PCT No.: PCT/JP2004/009905

§ 371 (c)(1),
(2), (4) Date: Jan. 3, 2006

(87) PCT Pub. No.: WO2005/006302

PCT Pub. Date: Jan. 20, 2005

(65) Prior Publication Data

US 2007/0109288 A1 May 17, 2007

(30) Foreign Application Priority Data

Jul. 9, 2003 (JP) ............................ 2003-272250

(51) Int. Cl.
*G09G 3/34* (2006.01)
*G06F 3/038* (2006.01)

(52) U.S. Cl. ..................................................... 345/211

(58) Field of Classification Search ................. 345/211, 345/213; 377/32; 713/320, 323, 324
See application file for complete search history.

(56) References Cited

U.S. PATENT DOCUMENTS

2003/0011548 A1* 1/2003 Nakajima .................... 345/87

FOREIGN PATENT DOCUMENTS

| | | | |
|---|---|---|---|
| EP | 1 083 540 | A2 | 3/2001 |
| EP | 1083540 | A2 * | 3/2001 |
| EP | 1 139 330 | A2 | 10/2001 |
| JP | 02-210492 | | 8/1990 |
| JP | 02-210492 | A | 8/1990 |
| JP | 07-271323 | | 10/1995 |
| JP | 07-271323 | A | 10/1995 |
| JP | 10-210116 | | 8/1998 |
| JP | 2000-321642 | | 11/2000 |
| JP | 2000-321642 | A | 11/2000 |
| JP | 2001-083944 | | 3/2001 |
| JP | 2001-083944 | A | 3/2001 |

OTHER PUBLICATIONS

International Search Report mailed Oct. 19, 2004.
International Search Opinion mailed Oct. 19, 2004.
Supplemental European Search Report issued Nov. 21, 2008 for corresponding European Application No. 04 74 7373.

* cited by examiner

*Primary Examiner*—Amr Awad
*Assistant Examiner*—Randal Willis
(74) *Attorney, Agent, or Firm*—Rader, Fishman & Grauer PLLC

(57) ABSTRACT

The present invention is applied, for example, to a liquid crystal display apparatus in which drive circuitry is formed integrally on an insulating substrate, wherein processing results from circuit blocks 41A, 41B on the side of a higher power supply voltage are inputted into the side of a lower power supply voltage through active elements performing on-off operation complementarily, and by the fall of the power supply voltage on this higher side, the output of these active elements is set to a predetermined level.

5 Claims, 6 Drawing Sheets

FLAT DISPLAY APPARATUS AND INTEGRATED CIRCUIT

BACKGROUND OF THE INVENTION

1. Technical Field

The present invention relates to a flat display apparatus and an integrated circuit and can be applied to, for example, liquid crystal display apparatus in which drive circuitry is integrally formed on an insulating substrate. In the present invention, processing results from a circuit block on the side of a higher power supply voltage is inputted to the side of a lower power supply voltage through active elements performing on-off operation complementarily, and the output of these active elements is set to a predetermined level by the fall of the power supply voltage on the higher side thereof, which can further reduce power consumption in the deep-standby mode or the like.

2. Background Art

In recent years, in a liquid crystal display apparatus that is a flat display apparatus applied to a mobile terminal device such as a mobile telephone, for example, there has been provided the one in which a drive circuit of a liquid crystal display panel such as a horizontal drive circuit and a vertical drive circuit is combined and integrated on a glass substrate which is an insulating substrate making up the liquid crystal display panel.

More specifically, in this type of liquid crystal display apparatus, a display unit is formed by arranging, in a matrix, pixels each composed of a liquid crystal cell, a polysilicon TFT (Thin Film Transistor) which is a switching element of this liquid crystal cell and a storage capacitor. In the liquid crystal display apparatus, the respective pixels of the display unit formed in this manner are sequentially selected on a line basis by the driving of gate lines by the vertical drive circuit. Furthermore, gradation data indicating the gradation of the respect pixels is sampled sequentially and circularly by the horizontal drive circuit to be collected on a line basis, and by driving respective signal lines according to a digital-analog conversion result of this gradation data, the respective selected pixels are driven by the gate lines according to the gradation data, thereby displaying a desired image.

In such liquid crystal display apparatus, power supplies required for the operation are generated from power supplied externally, in a DC-DC converter, which is a part of the drive circuit provided in the vicinity of the display unit and the resultant power supplies of a plurality of systems enable the operation. Specifically, the apparatus is arranged such that, for example, a power supply of 6V and a power supply of −3V are generated from a power supply of 3V that is supplied externally, and these power supplies of −3V, 3V, and 6V enable the operation.

Thus, in this type of liquid crystal display apparatus, for example, as shown in FIG. 1, a 6 V-system logic electronic circuit 1 which is a circuit block whose power supply voltage is 6V allows various types of processing to be executed at high speed and according to the results of the high speed processing, a 3 V-system logic electronic circuit 2 which is a circuit block whose power supply voltage is 3V is driven.

In a mobile telephone which is one of devices to which this liquid crystal display apparatus is applied, for example, as disclosed in Japanese Application Publication No. 10-210116, stopping the display of the liquid crystal display unit in a standby state prevents wasteful consumption of battery.

Specifically, in the mobile telephone, a backlight of the liquid crystal display apparatus is turned off by the control of a controller that controls overall operation, which reduces power consumption. Furthermore, the operation mode of the liquid crystal display apparatus is set to be a so-called deep standby mode.

Here, the deep standby mode is, in the liquid crystal display apparatus, an operation mode in which, although the power is supplied externally, by stopping the supply of various clocks as operation references, the operation of the drive circuit is stopped.

More specifically, when the operation of the liquid crystal display apparatus is stopped in this manner, the simplest method is a method of stopping the supply of power to the liquid crystal display apparatus. However, when such stop of the supply of power is executed outside of the liquid crystal display apparatus, the configuration becomes complicated for that purpose in the mobile telephone. In contrast, while a method of shutting off the power supplied externally inside of the liquid crystal display apparatus is considered, in this case, the configuration of the active elements relating to the control of the power supply is increased in size, which brings an increase in size to the shape of the liquid crystal display apparatus itself.

Therefore, in this type of liquid crystal display apparatus, the deep standby mode is provided, in which the supply of clocks is stopped to stop the operation and to reduce the power consumption. Furthermore, in this deep standby mode, the operation of the DC-DC converter is switched so that the lowest power supply voltage in the liquid crystal display apparatus is outputted, which prevents through-currents between circuit blocks having different power supply voltages.

More specifically, FIG. 2 is a block diagram showing a configuration of a part of a digital-analog conversion circuit in this type of liquid crystal display apparatus. In this type of liquid crystal display apparatus, a predetermined generation reference voltage is resistively divided by resistances in a reference voltage generating circuit to generate a plurality of reference voltages. The plurality of reference voltages are selectively outputted according to the gradation data to thereby apply digital-analog conversion processing to the gradation data, and according to this digital-analog processing result, the respective pixels are driven. Furthermore, for example, in the case where the pixels are driven by line inversion, the polarity of this generation reference voltage is switched on a horizontal scanning cycle.

FIG. 2 is a diagram showing a circuit block relating to the switching of the polarity of the generation reference voltage and the generation of the reference voltages in such manners. In the liquid crystal display apparatus, various reference signals in sync with the gradation data are processed by a circuit block whose power supply voltage is 6V to thereby generate a polarity switching signal of the generated reference voltage and this polarity switching signal and an inversion signal of the polarity switching signal are outputted to a reference voltage generating circuit 5 via buffer circuits 3, 4 operating by the power supply voltage of 6V.

The reference voltage generating circuit 5 is a circuit block operating by a power supply voltage of 3V and by driving switch circuits 6 and 7 each composed of a CMOS (Complementary Metal Oxide Semiconductor) by the output signals of the buffer circuits 3, 4, contact points of the switch circuits 6 and 7 are switched complementarily to switch the polarity of the generated reference voltage to be outputted to a resistance block 8. Thus, in the example as shown in FIG. 2, the generated reference voltage is switched between +3V and −3V.

In the reference voltage generating circuit 5, the resistance block 8 is composed of a series circuit of a plurality of resistances and reference voltages V1 to V30 is generated by resistively dividing the generated reference voltage by this resistance block 8.

In such a configuration, when the operation of the DC-DC converter is simply stopped, the power supply voltage falls to 0V in the circuit block of the power supply voltage 6V, and as a result, the output of the buffer circuits 3, 4 is held in a state of falling to 0V. In this case, in the switch circuits 6, 7 receiving the output of these buffer circuits 3, 4, switch circuits 6A, 6B, 7A, 7B making up the respective switch circuits 6, 7 are held in an on-state, which causes through-currents 16, 17 in the switch circuits 6, 7.

In this case, also, for the circuit block of the power supply voltage 3V, by making the power supply fall, through-currents can be prevented. However, the fall of the power supply of the circuit block of the power supply 3V ends up shutting off the power supplied to the liquid crystal display apparatus itself, which causes problem such as an increase in size of the liquid crystal display apparatus as described above. Therefore, in this case, the switching of the operation of the DC-DC converter allows the power supply of 6V to fall to 3V in the liquid crystal display apparatus to prevent the through-currents.

However, even when the power supply of 6V is made to fall to 3V by the switching of the operation of the DC-DC converter in this manner, leak current by the power supply voltage 3V eventually continues to flow in each active element. If such leak current can be reduced, the power consumption can be further reduced in the deep standby mode.

DISCLOSURE OF THE INVENTION

The present invention is achieved in light of the above-described points and is intended to propose a flat display apparatus and an integrated circuit capable of further reducing power consumption in the deep standby mode or the like.

In order to solve the problems, the present invention is applied to a flat display apparatus, wherein a drive circuit has a first circuit block operating by a first power supply voltage and a second circuit block that processes processing results by the first circuit block and operates by a second power supply voltage lower than the first power supply voltage, the second circuit block receives the input of one processing result of the first circuit block at active elements performing on-off operation complementarily, and the first circuit block has a level setting circuit that sets a level of the one processing result so as to hold the output of the active elements at a predetermined level by the fall of the first power supply voltage.

According to a configuration of the present invention, when the present invention is applied to a flat display apparatus, wherein the drive circuit has the first circuit block operating by the first power supply voltage and the second circuit block that processes the processing results by the first circuit block and operates by the second power supply voltage lower than the first power supply voltage, the second circuit block receives the input of one processing result of the first circuit block at the active elements performing on-off operation complementarily, and the first circuit block has the level setting circuit that sets the level of the one processing result so as to hold the output of the active elements at the predetermined level by the fall of the first power supply voltage. Therefore, by receiving the one processing result of the first circuit block at the active elements performing on-off operation complementarily, through-currents in the active elements can be prevented from occurring, whichever level the first processing result becomes by the fall of the first power supply voltage. Furthermore, by having the level setting circuit that sets the level of the one processing result so as to hold the output of these active elements at the predetermined level, the output level of the active elements can be set by this level setting circuit to prevent unintended display on a display unit. Thus, according to the configuration of the present invention, the first power supply voltage can be completely made to fall while preventing various inconveniences, which reduces leak currents in the circuit block relating to the first power supply voltage and further reduces power consumption as compared with the conventional art.

Furthermore, the present invention is applied to an integrated circuit, wherein a second circuit block receives the input of one processing result of a first circuit block at active elements performing on-off operation complementarily, and the first circuit block has a level setting circuit that sets a level of the one processing result so as to hold the output of the active elements at a predetermined level by the fall of the first power supply voltage.

Thus, according to the present invention, an integrated circuit capable of further reducing power consumption in the deep standby mode or the like can be provided.

According to the present invention, the power consumption can be further reduced in the deep standby mode or the like.

BEST MODE FOR CARRYING OUT THE INVENTION

Figure 1:
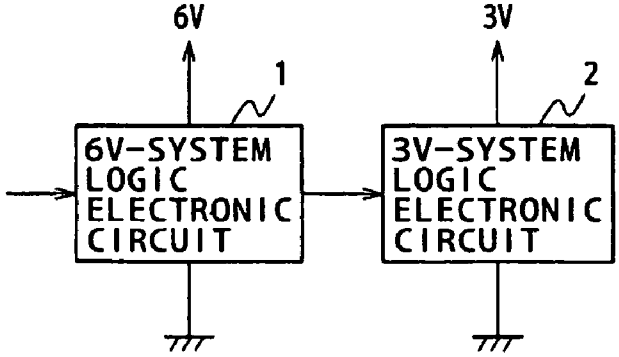
FIG. 1 BACKGROUND ART
FIG. 1 is a block diagram for explaining circuit blocks of different power supply voltages.

Hereinafter, the embodiments of the present invention are described in detail, referring to the drawings as necessary.

(1) Configuration of Embodiment

Figure 3:
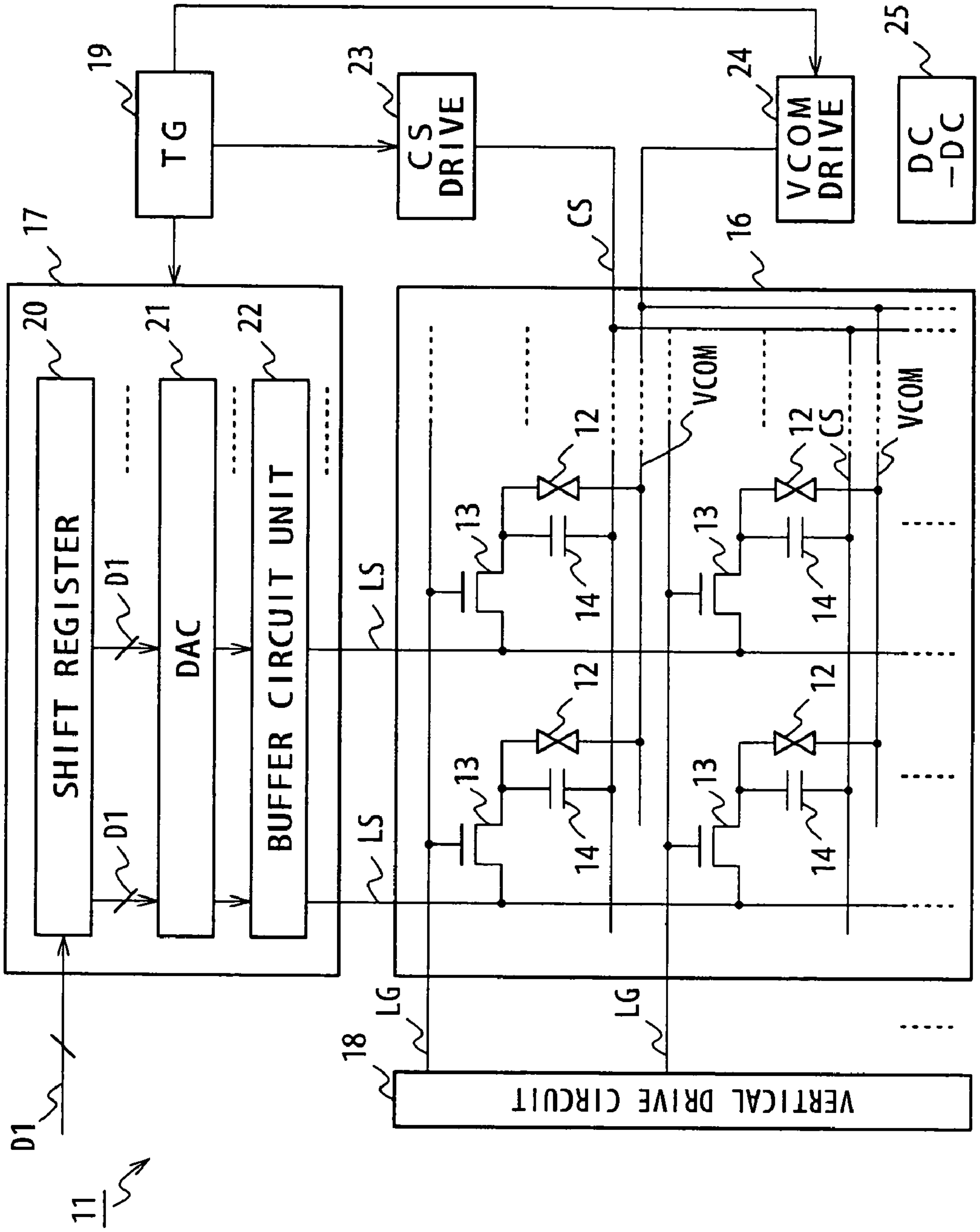
FIG. 3 is a block diagram showing a liquid crystal display apparatus according to Embodiment 1 of the present invention.

FIG. 3 is a block diagram showing a liquid crystal display apparatus according to Embodiment 1 of the present invention. In this liquid crystal display apparatus 11, pixels are each formed of a liquid crystal cell 12, a polysilicon TFT 13 which is a switching element of this liquid crystal cell 12, and a storage capacitor 14, and these pixels are arranged in a matrix to form a display unit 16. In the liquid crystal display apparatus 11, the respective pixels forming this display unit 16 are connected to a horizontal drive circuit 17 and a vertical drive circuit 18 via signal lines LS and gate lines LG, respectively, and the pixels are sequentially selected by the driving of the gate lines LG by the vertical drive circuit 18 and the gradation of the respective pixels is set by a drive signal from the horizontal drive circuit 17, so that the liquid crystal display apparatus 11 displays a desired image.

More specifically, in the liquid crystal display apparatus 11, into a timing generating circuit (TG) 19 are inputted various timing signals, such as a master clock in sync with gradation data D1, a horizontal synchronizing signal, and a vertical synchronizing signal and these various timing signals are processed, so that the various timing signals required for the operation of this liquid crystal display apparatus 11 are outputted.

The vertical drive circuit 18 drives the respective gate lines LG according to the timing signal outputted from the timing generating circuit 19, thereby sequentially selecting the pixels on a line base in conjunction with the processing in the horizontal drive circuit 17.

The horizontal drive circuit 17 sequentially and circularly takes in the gradation data D1 indicating the gradation of the respective pixels and drives the respective signal lines LS, according to the timing signal outputted from the timing generating circuit 19. More specifically, in the horizontal drive circuit 17, a shift register 20 sequentially and circularly samples the gradation data D1, thereby collecting the gradation data on a line basis, and outputting the gradation data of one line to a digital-analog conversion circuit (DAC) 21 at predetermined timing for a horizontal blanking period.

The digital-analog conversion circuit 21 applies digital-analog conversion processing to the gradation data D1 outputted from the shift register 21 respectively to output. A buffer circuit unit 22 drives the respective signal lines LS according to the output signal of this digital analog conversion circuit 21, so that in the horizontal drive circuit 17, the respective pixels of the display unit 16 are driven by the gradation according to the gradation data D1 and a desired image is displayed.

In a CS drive circuit 23 and a VCOM drive circuit 24, for CS wiring CS and VCOM wiring VCOM connected to electrodes of the storage capacitor 14 and the liquid crystal cell 12 on the side where the TFT 13 is not connected, respectively, the potentials of the CS wiring CS and the VCOM wiring VCOM are switched on a horizontal scanning cycle, for example. Accordingly, in this liquid crystal display apparatus 11, respective electrode potentials of the storage capacitor 14 and the liquid crystal cell 12 are switched to execute pre-charge processing, thereby preventing deterioration of the respective liquid crystal cells 12.

A DC-DC converter (DC-DC) 25 generates, from the power supply inputted outside of this liquid crystal display apparatus 11, power supplies required for the operation of this liquid crystal display apparatus 11 to output. Specifically, as this power supply inputted externally, the power supply of a voltage 3V is applied to the DC-DC converter 25 and the DC-DC converter 25 generates power supplies of a voltage 6V and a voltage −3V from this power supply of the voltage 3V. Thus, in the liquid crystal display apparatus 11, the power supplies required for the operation are generated from the power supply inputted externally in a built-in power supply circuit, so that the liquid crystal display apparatus 11 operates by a plurality of power supplies. Furthermore, the DC-DC converter 25 stops the operation by switching the operation mode to the deep standby mode by an upper controller, and as to the power supplies of the voltage 6V and the voltage −3V, the power supply voltages thereof fall to 0V. In the liquid crystal display apparatus 11, as for the power supply of the voltage 3V, the power continues to be supplied even in this deep standby mode.

Figure 2:
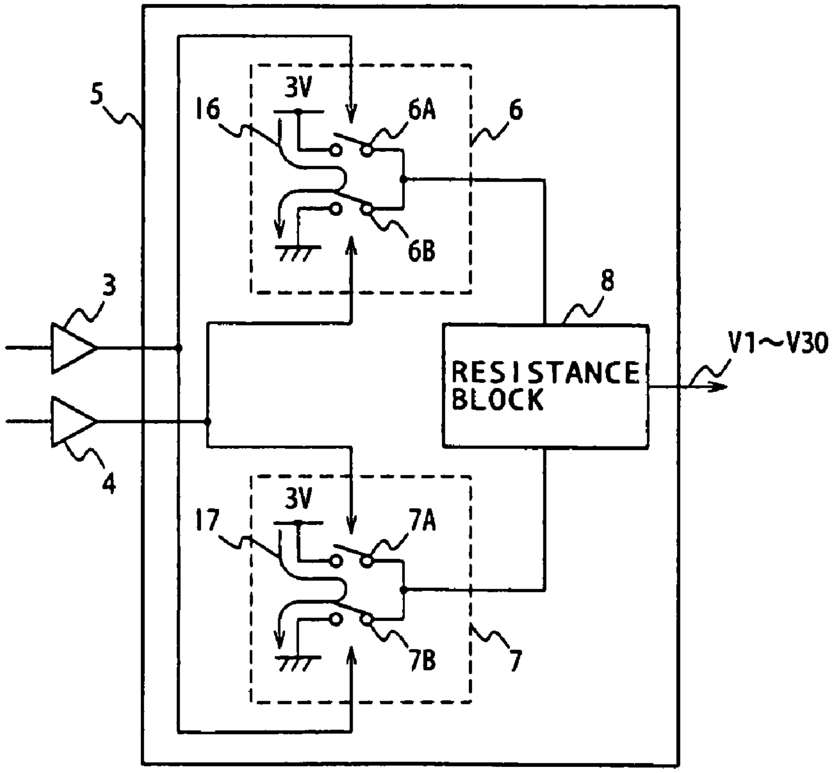
FIG. 2 BACKGROUND ART
FIG. 2 is an electrical schematic diagram for explaining through-currents.
Figure 4:
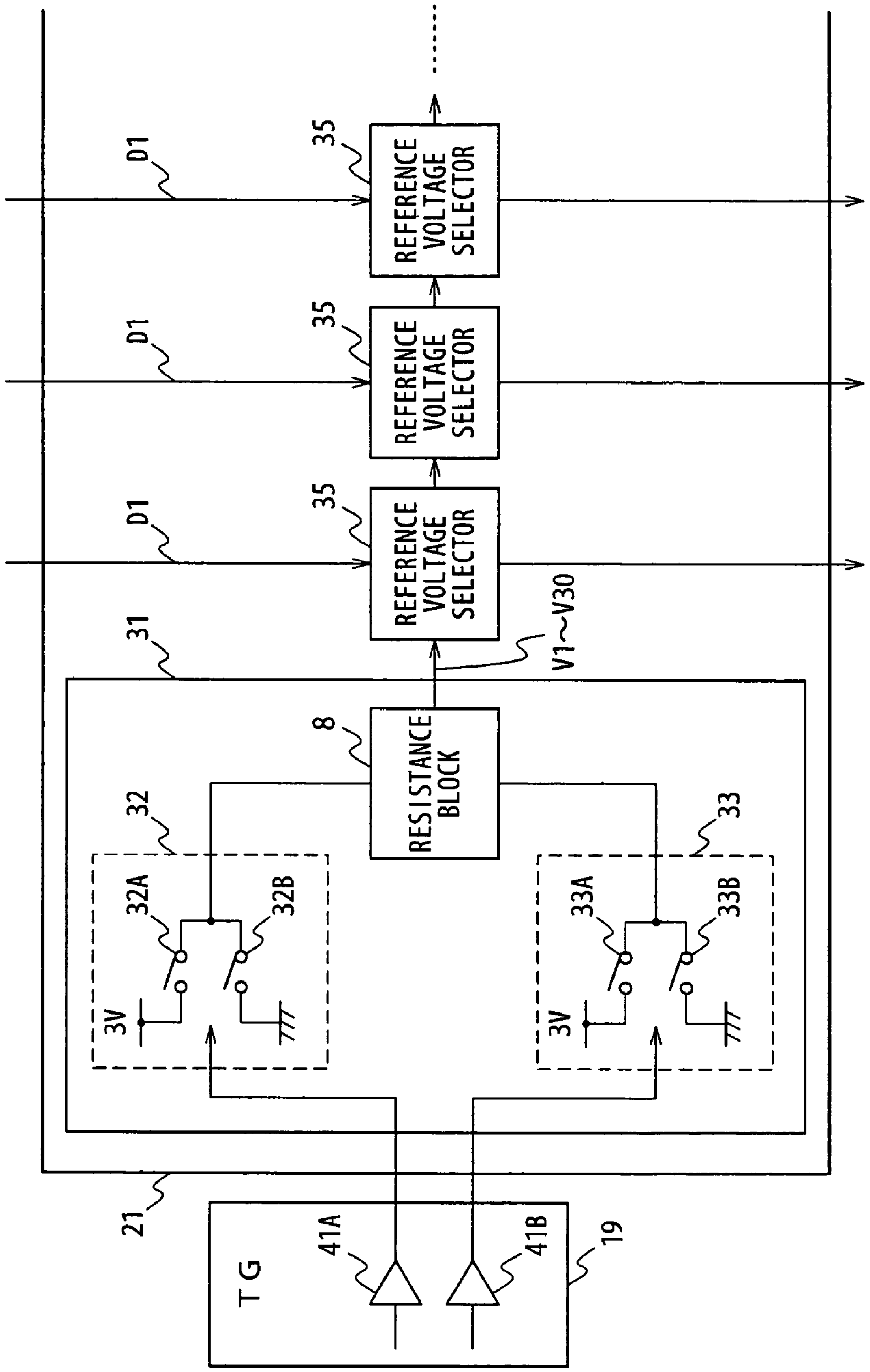
FIG. 4 is a block diagram showing a part of a horizontal drive circuit of the liquid crystal display apparatus of FIG. 3.

FIG. 4 is a block diagram showing the digital-analog conversion circuit 21 together with its peripheral configuration. In this digital-analog conversion circuit 21, a plurality of reference voltages V1 to V30 is generated by resistively dividing a generated reference voltage by resistances in a reference voltage generating circuit 31 to generate, and these reference voltages V1 to V30 are selectively outputted according to the respective pieces of the gradation data D1, thereby performing the digital-analog processing to the gradation data D1. In the configuration as shown in FIG. 4, the same configuration portions as those of the digital-analog conversion circuit described above in reference to FIG. 2 are indicated by corresponding reference numerals and signs and overlapped description is omitted.

More specifically, in the reference voltage generating circuit 31, in a switch circuit 32, one terminal of a switch circuit 32A and one terminal of a switch circuit 32B, which are switched complementarily between on- and off-states by the switching signal outputted from the timing generating circuit 19, are connected to a reference voltage line of a voltage 3V and a ground line, respectively, and the other terminals of these switch circuits 32A and 32B are connected to one terminal of the resistance block 8. Furthermore, in a switch circuit 33, one terminal of a switch circuit 33A and one terminal of a switch circuit 33B, which are switched complementarily between on- and off-states by an inversion signal of the switching signal outputted from the timing generating circuit 19, are connected to a reference voltage line of a voltage 3V and a ground line, respectively, and the other terminals of these switch circuits 33A and 33B are connected to the other terminal of the resistance block 8. Thus, the switch circuits 32 and 33 each select the reference voltage line or the ground line complementarily via the switch circuits 32A, 32B and the switch circuits 33A, 33B.

Accordingly, in the reference voltage generating circuit 31, the generated reference voltage applied to the resistance block 8 is switched every horizontal scanning period and the generated reference voltage whose polarity is switched is resistively divided by the resistance block 8 to generate a plurality of reference voltages V1 to V30.

In the reference voltage generating circuit 31, these switch circuits 32A and 33A are each formed of a PMOS transistor, while the switch circuits 32B and 33B are each composed of an NMOS transistor. Accordingly, each of the switch circuits 32, 33 receives the input of one processing result of the circuit block at a previous stage via the PMOS transistor and the NMOS transistor which are active elements performing on-off operation complementarily, and whichever level the input level of the active elements becomes by the fall of the power supply voltage of the circuit block at the previous stage, through-currents in these active elements can be prevented from occurring.

Furthermore, in the reference voltage generating circuit 31, when the switching signal and the inversion signal of the switching signal which are outputted from the timing generating circuit 19 are held at 3V in the deep standby mode, respectively, the both-terminal potential of the resistance block 8 is held at 0V to prevent unintended display from appearing on the display unit 16.

Into reference voltage selectors 35 are inputted the reference voltages V1 to V30 outputted from the reference voltage generating circuit 31, respectively, and these inputted reference voltages V1 to V30 are selectively outputted according to the gradation data, so that in this digital-analog conversion circuit 21, the digital-analog conversion result of the gradation data D1 is outputted.

Thus, in this liquid crystal display apparatus 11, the respective circuit blocks of digital-analog conversion circuit 21 operate by the power supply voltage of 3V, while in the timing generating circuit 19 outputting the operation reference of this digital-analog conversion circuit 21, the operation is performed by the power supply voltage 6V and the switching signal and the inversion signal of the switching signal which are the operation reference are outputted from the buffer circuits 41A, 41B.

Figure 5:
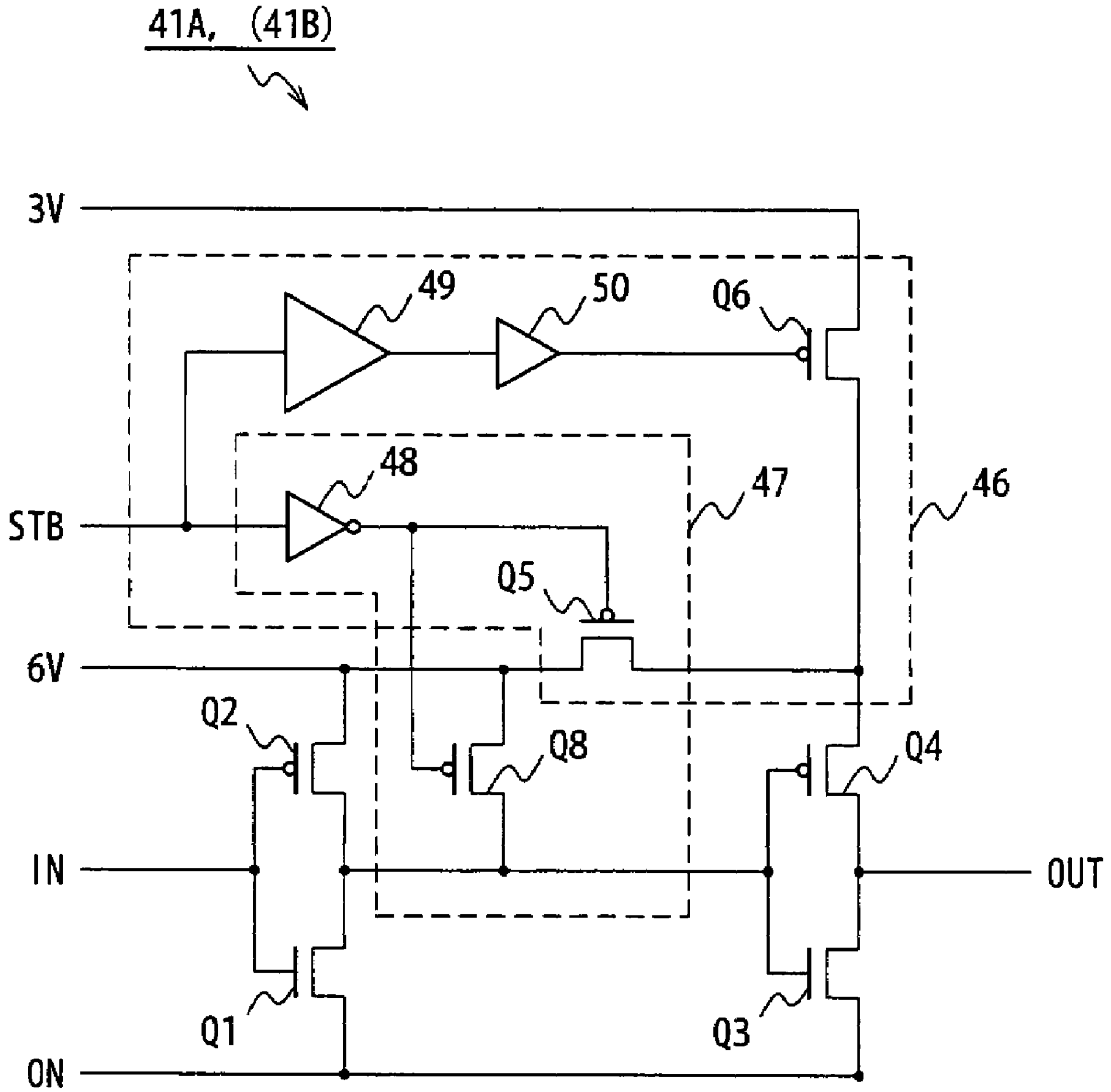
FIG. 5 is an electrical schematic diagram showing a buffer circuit applied to the liquid crystal display apparatus of FIG. 3.

FIG. 5 is an electrical schematic diagram showing a configuration of these buffer circuits 41A, 41B. Since the buffer circuits 41A, 41B are configured in the same manner except that the signals to be processed are different, hereinafter, a description of the buffer circuit 41A is given and overlapped description is omitted.

In the buffer circuit 41A, a CMOS inverter composed of a PMOS transistor Q1 and an NMOS transistor Q2 whose gate and drain are commonly connected, respectively, and, similarly, a CMOS inverter composed of a PMOS transistor Q3 and an NMOS transistor Q4 are connected in series, and the output of the CMOS inverter composed of the transistors Q3 and Q4 is outputted as the switching signal or the inversion signal of the switching signal. In these CMOS inverters, the CMOS inverter composed of the transistors Q1 and Q2 at the first stage operates by the power supply voltage 6V, so that when the operation of the DC-DC converter 25 is stopped by the deep standby mode, the output falls to 0 level.

In contrast, the inverter composed of the transistors Q3 and Q4 which outputs to the reference voltage generating circuit 31, by a power supply switching circuit 46, operates by the power supply voltage 6V in a normal operation state, while, in the deep standby mode, it operates by the power supply voltage 3V. Furthermore, a level setting circuit 47 allows an input level to be set to an L level in the deep standby mode, by which an output level can be held at 3V.

Figure 6:
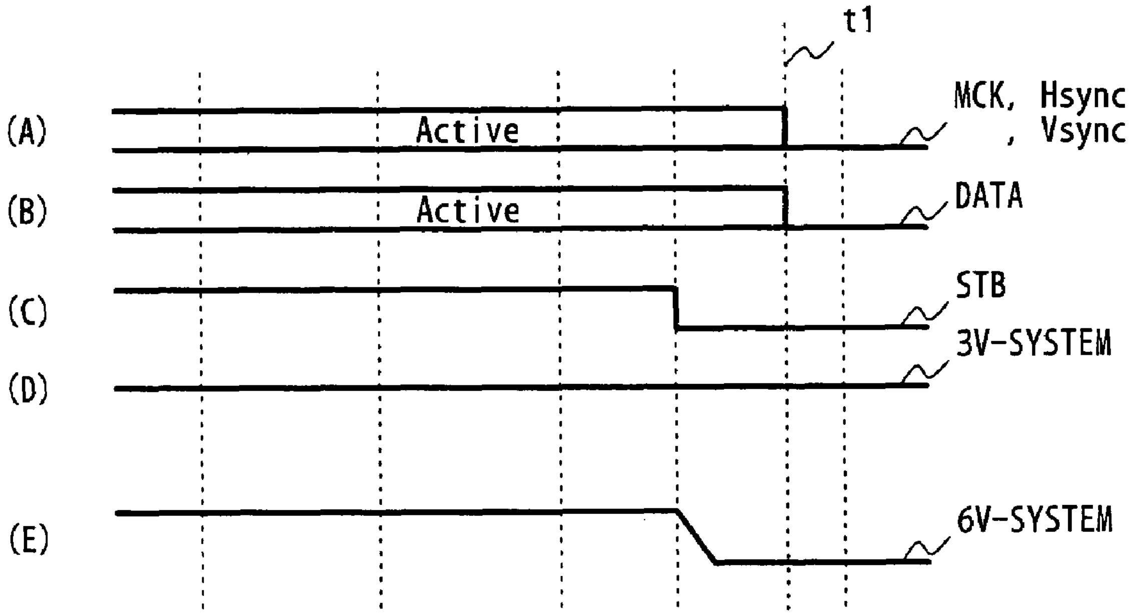
FIG. 6 is a time chart showing the transition of respective units at the time of power supply fall in the buffer circuit of FIG. 5.

More specifically, in the timing generating circuit 19, as indicated by a time point t1 in FIG. 6, when the switching of the operation mode to the deep standby mode is instructed by the controller, the DC-DC converter 25 stops its operation, so that a logical level of a control signal STB outputted from the circuit system of the power supply voltage 6V falls ((C) in FIG. 6), and then the supply of the gradation data D1 and various reference signals is stopped ((A) and (B) in FIG. 6). In this FIG. 6, MCK denotes a master clock in sync with the gradation data D1, and Hsync and Vsync denote a horizontal synchronizing signal and a vertical synchronizing signal, respectively.

The power supply switching circuit 46 is arranged so that this control signal STB is inputted into an inverter 48 composed of a circuit block of the power supply voltage 6V and is supplied to an NMOS transistor Q5 connecting a power supply line of the inverter composed of the transistors Q3 and Q4 and a power supply line of 6V. Accordingly, when the logical level of the control signal STB rises by the normal operation mode, the power supply switching circuit 46 holds the transistor Q5 in an on-state to hold the power supply voltage of the inverter composed of the transistors Q3 and Q4 at 6V. Furthermore, when the logical level of the control signal STB falls by the deep standby mode ((E) in FIG. 6), the power supply switching circuit 46 sets the transistor Q5 to an off-state, and cuts off the power supply line of the inverter composed of the transistors Q3 and Q4 from the power supply line of 6V, which has fallen to 0V.

Furthermore, in the power supply switching circuit 46, the control signal STB is inputted into a level shift circuit 49 composed of a circuit block of the power supply voltage 6V so that the level of this control signal STB is shifted so as to correspond to a circuit block of a power supply voltage 3V, and this output of this level shift circuit 49 is inputted into a buffer circuit 50 composed of the circuit block of the power supply voltage 3V. The power supply switch circuit 46 is arranged so that the output of this buffer circuit 50 is supplied to an NMOS transistor Q6 connecting the power supply line of the inverter composed of the transistors Q3 and Q4 and a power supply line of 3V. Accordingly, when the logical level of the control signal STB rises by the normal operation mode, the power supply switching circuit 46 holds the transistor Q6 in an off-state to cut off the power supply line of the inverter composed of the transistors Q3 and Q4 from the power supply line of 3V, and on the other hand, when the logical level of the control signal STB falls by the deep standby mode, the transistor Q6 is set to an on-state so as to connect the power supply line of the inverter composed of the transistors Q3 and Q4 to the power supply line of 3V.

These allow the power supply switching circuit 46 to switch the power supply voltage of the buffer circuit by the transistors Q3, Q4 between in the normal operation state and in the deep standby mode, based on the control signal STB.

According to the output of the inverter 48, the level setting circuit 47 performs on-off control over an NMOS transistor Q8 disposed between the output line of the transistors Q1 and Q2 and the power supply line of 6V, so that in the normal operation mode, the transistor Q8 is set to an off-state to supply the output of the inverter composed of the transistors Q1 and Q2 to the inverter composed of the transistor Q3 and Q4 and switch the polarity of the generated reference voltage in the reference voltage generating circuit 31 so as to correspond to the line inversion. In contrast, in the deep standby mode, the transistor Q8 is set to an on-state to hold the input of the inverter composed of the transistors Q3 and Q4 at the L level, and when the power supply line of voltage 6V completely falls to 0V, the both-terminal potential of the resistance block 8 in the reference voltage generating circuit 31 is held at 0V, and further, through-currents in the switch circuits 32 and 33 are prevented.

Figure 7:
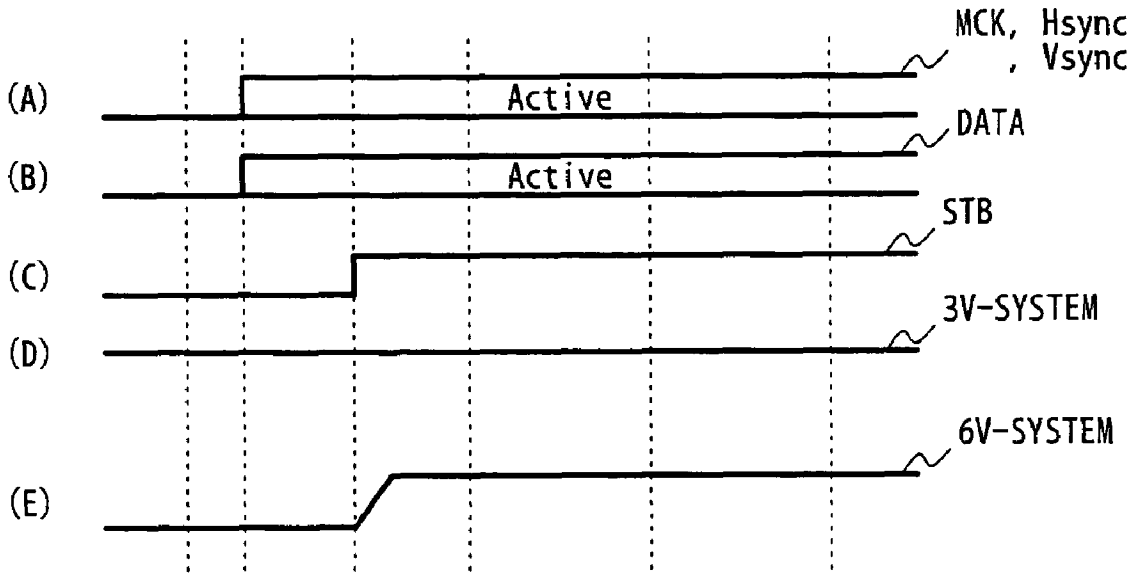
FIG. 7 is a time chart showing the transition of the respective units at the time of power supply rise in the buffer circuit of FIG. 5.

FIG. 7 is a time chart showing transition from the deep standby mode to the normal operation mode in contrast to FIG. 6.

According to the foregoing, in this liquid crystal display apparatus 11, the power supply voltage of 6V and the power supply voltage of 3V compose a first power supply voltage and a second power supply voltage lower than this first power supply voltage, respectively, and in the drive circuits relating to the digital-analog conversion processing of the gradation data D1, the timing generating circuit 19 constitutes a first circuit block operating by the first power supply voltage, and the reference voltage generating circuit 31 constitutes a second circuit block that processes the processing results by this first circuit block and operates by the second power supply voltage.

Furthermore, the switch circuits 32A, 32B or the switch circuits 33A, 33B of the reference voltage generating circuit 31 receive the input of one processing result of the first circuit block and constitute active elements performing on-off operation complementarily, and the level setting circuit 47 of the buffer circuit 41A or 41B constitutes a level setting circuit that sets the level of the processing result, which is the buffer circuit output, so as to hold the output of the above-described active elements at a predetermined level by the fall of the first power supply voltage.

Furthermore, in the buffer circuit 41A, the inverter composed of the transistors Q1 and Q2 constitutes a first inverter which operates by the first power supply and outputs the processing result, the inverter composed of the transistors Q3 and Q4 constitutes a second inverter outputting the output of the first inverter to the reference voltage generating circuit 31, which is the second circuit block, and the power supply switching circuit 46 constitutes a power supply switching circuit switching the power supply voltage of the second inverter from the first power supply voltage to the second power supply voltage by the fall of the first power voltage.

Figure 8:
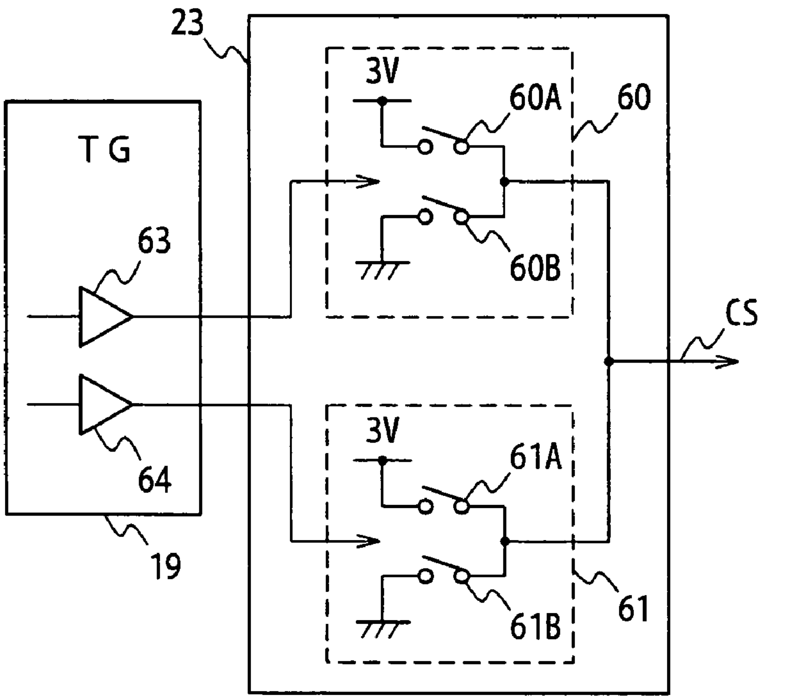
FIG. 8 is a block diagram showing a CS drive circuit of the liquid crystal display apparatus of FIG. 3

FIG. 8 is a block diagram showing the CS drive circuit 23 together with its peripheral configuration. In the CS drive circuit 23, according to the switching signals outputted from the timing generating circuit 19, the potential of a CS line CS is switched between 3V and 0V every horizontal scanning period. More specifically, the CS drive circuit 23 is, similar to the reference voltage generating circuit 31, provided with a switch circuit 60 composed of switch circuits 60A and 60B composed of a PMOS transistor and an NMOS transistor that are complementarily switched between on- and off-states, and a switch circuit 61 composed of switch circuits 61A and 61B composed of a PMOS transistor and an NMOS transistor similarly, and the output of these switch circuits 60, 61 is outputted to the CS lines CS.

Corresponding to the configuration of this CS drive circuit 23, in the timing generating circuit 19, buffer circuits 63, 64 having the same configuration as described above in reference to FIG. 5 allow the switching signals of the switch circuits 60, 61 to be outputted. Accordingly, in this liquid crystal display apparatus 11, the CS drive circuit 23 is also arranged to prevent through-currents in the switch circuits 60, 61 and to hold the potential of the CS line CS at 0V when a power supply line of a voltage 6V completely falls to 0V.

Figure 9:
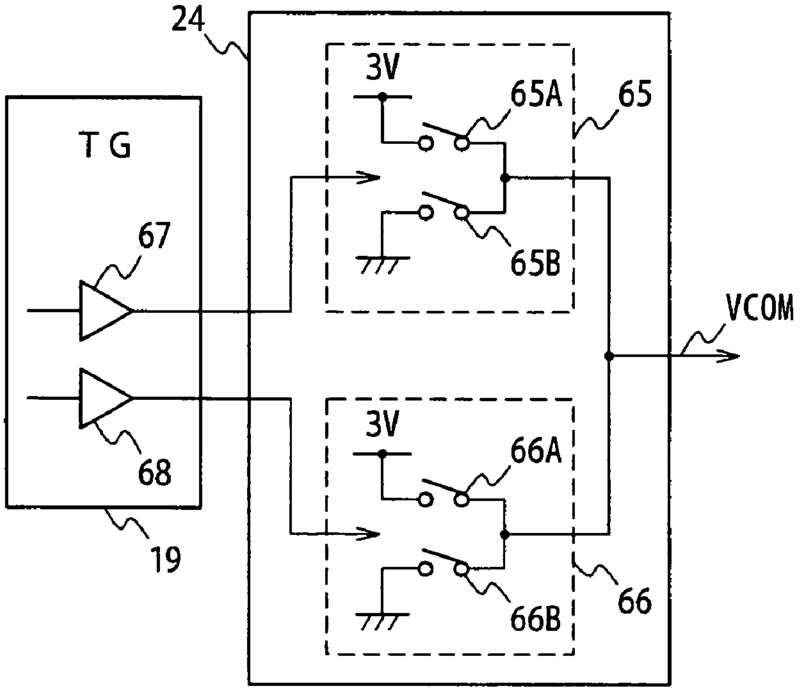
FIG. 9 is a block diagram showing a VCOM drive circuit of the liquid crystal display apparatus of FIG. 3.

FIG. 9 is a block diagram showing the VCOM drive circuit 24 together with a peripheral configuration. In the VCOM drive circuit 24, the switching signals outputted from the timing generating circuit 19 also switch the potential of a VCOM line VCOM between 3V and 0V every horizontal scanning period. More specifically, the VCOM drive circuit 24 is, similar to the reference voltage generating circuit 31, provided with a switch circuit 65 composed of switch circuits 65A and 65B composed of a PMOS transistor and an NMOS transistor that are complementarily switched between on- and off-states, and a switch circuit 66 composed of switch circuits 66A and 66B composed of a PMOS transistor and an NMOS transistor similarly, and the output of these switch circuits 65, 66 is outputted to the VCOM lines VCOM.

Corresponding to the configuration of this VCOM drive circuit 24, in the timing generating circuit 19, buffer circuits 67, 68 having the same configuration as described above in reference to FIG. 5 allow the switching signals of the switch circuits 65, 66 to be outputted. Accordingly, in this liquid crystal display apparatus 11, the VCOM drive circuit 24 is also arranged to prevent through-currents in the switch circuits 65, 66 and to hold the potential of the VCOM line VCOM at 0V when a power supply line of a voltage 6V completely falls to 0V.

According to the foregoing, in the liquid crystal display apparatus 11, in the drive circuits relating to the precharge processing, the timing generating circuit 19 constitutes a first circuit block operating by the first power supply voltage, and the CS drive circuit 23 and the VCOM drive circuit 24 each constitute a second circuit block processing the processing results by this first circuit block and operating by the second power supply voltage.

(2) Operation of Embodiment

In the above-described configuration, in this liquid crystal display apparatus 11 (FIG. 3), the gradation data D1 instructing the gradation of the respective pixels is inputted from the controller relating to drawing or the like in the order of raster scanning, and this gradation data D1 is sequentially sampled by the shift register 20 in the horizontal drive circuit 17 to be collected on a line basis and transferred to the digital-analog conversion circuit 21. The gradation data D1 is converted to an analog signal by the digital-analog conversion processing in this digital-analog conversion circuit 21, and this analog signal drives the respective signal lines LS of the display unit 16. Accordingly, in the liquid crystal display apparatus 11, the respective pixels of the display unit 16 sequentially selected by the control of the gate lines LG by the vertical drive circuit 18 are driven by the horizontal drive circuit 17 to display an image according to the gradation data D1 on the display unit 16.

In the horizontal drive circuit 17 driving the signal lines LS of the display unit 16 in this manner (FIG. 4), the generated reference voltage is resistively divided by the resistance block 8 in the reference voltage generating circuit 31 to generate the reference voltages V1 to V30 corresponding to the respective gradations of the gradation data D1, and in the reference voltage selectors 35, these reference voltages V1 to V30 are selected according to the respective pieces of gradation data D1. Accordingly, the gradation data D1 is subjected to the digital-analog conversion processing and this digital-analog conversion processing result is supplied to the signal lines LS via the buffer circuit unit 22.

In such digital-analog conversion processing, in the liquid-crystal display apparatus 11, the switch circuits 32, 33 switches the output voltage complementarily according to the output of the timing generating circuit 19, so that the polarity of the applied voltage to the resistance block 8 is switched every horizontal scanning cycle, by which the polarity of the generated reference voltage is switched every horizontal scanning cycle. Furthermore, in the CS drive circuit 23 and the VCOM drive circuit 24 (FIGS. 8 and 9), similarly, the output voltages are switched complementarily by the switch circuits 60, 61 and the switch circuits 65, 66 according to the output of the timing generating circuit 19, so that the electrode potential of the storage capacitors 14 and the electrode potential of the liquid crystal cells 12 are switched to predetermined potentials every horizontal scanning, respectively. Accordingly, in the liquid crystal display apparatus 11, the display unit 16 is driven by so-called line inversion, and precharge processing is executed corresponding to this line inversion and the respective liquid crystal cells 12 are prevented from deteriorating.

In the liquid crystal display apparatus 11, the power supply of 3V is inputted by the external input, and in the DC-DC converter 25, the power supplies of 6V and −3V are generated from this power supply by external input. In the liquid crystal display apparatus 11, the timing generating circuit 19 operates at high speed by the voltage 6V to generate timing signals of the respective blocks, while the reference voltage generating circuit 31, the CS drive circuit 23, and the VCOM drive circuit 24, which receive the input of the timing signals which are processing results of this timing generating circuit 19, operate by the power supply of 3V, thereby reducing the whole power consumption.

In the liquid crystal display apparatus 11, in the reference voltage generating circuit 31, the CS drive circuit 23, and the VCOM drive circuit 24 which receive the input of such timing signals from the timing generating circuit 19, the respective switch circuits 32, 33, 60, 61, 65, 66 are composed of the switch circuits 32A, 33A, 60A, 61A, 65A, 66A composed of PMOS transistors and the switch circuits 32B, 33B, 60B, 61B, 65B, 66B composed of NMOS transistors, which are active elements performing on-off operation complementarily, and each of the active elements receives the input of one control signal. Thus, whichever level the level of the output from the timing generating circuit 19 is, in the respective switch circuits 32, 33, 60, 61, 65, 66, a case where the respective active elements are simultaneously in an on-state can be surely prevented.

Thus, in the liquid crystal display apparatus 11, even when the operation of the DC-DC converter 25 is completely stopped to stop the power supply to the circuit block of the power supply voltage 6V, through-currents can be prevented from occurring in the interface between the circuit block of the power supply voltage 6V and the circuit block of the power supply voltage 3V. Accordingly, in the liquid crystal display apparatus 11, when the switching of the operation to the deep standby mode is instructed by the upper controller, the DC-DC converter 25 completely stops the operation to stop the power supply to the timing generating circuit 19 which is a circuit block of the power supply voltage 6V, which further reduces the power consumption as compared with the conventional art. More specifically, as in the conventional deep standby mode, when the power supply of 6V is made to fall to 3V, leak current by the power supply voltage 3V still continues to flow through the circuit block of the power supply voltage 6V, while in this liquid crystal display apparatus 11, the power supply of 6V is made to fall completely, which can prevent such leak current and further reduce the power consumption as compared with the conventional art.

However, in this manner, although the through-currents in the respective switch circuits 32, 33, 60, 61, 65, 66 can be prevented, there occurs a case where the output potentials of the respective switch circuits 32, 33, 60, 61, 65, 66 rise, by which there arises the possibility that unintended display is displayed on the display unit 16 and further that in the deep standby mode, a degree of electric field may continue to be applied to the liquid crystal cells 12 and the storage capacitors 14.

Therefore, in the liquid crystal display apparatus 11 (FIG. 5), in the buffer circuits 41A, 41B, 63, 64, 67, 68, of the timing generating circuit outputting the switching signals of these switch circuits 32, 33, 60, 61, 65, 66, the output levels of the buffer circuits 41A, 41B, 63, 64, 67, 68 are set by the level setting circuit 47 so that the output levels of these switch circuits 32, 33, 60, 61, 65, 66 become predetermined levels. As a presumption of such level setting by the level setting circuit 47, as to the inverter at the last stage, the power supply for operation is switched by the fall of the power supply voltage of 6V by the power supply switching circuit 46.

More specifically, in the buffer circuits 41A, 41B, 63, 64, 67, 68, the switching signals are outputted to the respective switch circuits 32, 33, 60, 61, 65, 66 via the inverter composed of the transistors Q1 and Q2 and the inverter composed of the transistors Q3 and Q4 in order, so that the inverter composed of the transistors Q1 and Q2 operates by the power supply voltage 6V, while the inverter composed of the transistors Q3 and Q4 is connected to the power supplies of 6V and 3V via the transistors Q5 and Q6, respectively.

In the buffer circuits 41A, 41B, 63, 64, 67, 68, in the normal operation state, these transistors Q5 and Q6 are held in an on-state and an off-states, respectively, so that the inverter composed of the transistors Q3 and Q4 operates by the power supply voltage 6V in this case and outputs the switching signals to the respective switch circuits 32, 33, 60, 61, 65, 66. In contrast, in the deep standby mode, the transistors Q5 and Q6 switch the operation to an off-state and to an on-state, respectively, so that in the inverter composed of the transistors Q1 and Q2 at the previous stage, the operation is stopped by the fall of the power supply of 6V, while in the inverter composed of the transistors Q3 and Q4 at the last stage, the power supply voltage is switched to 3V and the operation state is held.

In this state, in the inverter composed of the transistors Q3 and Q4, the input level is held at 0 level by the setting by the transistor Q8, and as a result, the output of the switch circuits 32, 33, 60, 61, 65, 66 is held at 0 level. Thus, in the liquid crystal display apparatus 11, various adverse effects due to the fall of the power supply voltage, such as unintended display on the display unit 16 and continued application of a degree of electric field to the liquid crystal cells 12 and the storage capacitors 14, can be effectively avoided.

(3) Effects of Embodiment

According to the above-described configuration, the processing results from the circuit block on the side of the higher power supply voltage are inputted into the side of the lower power supply voltage through the active elements performing on-off operation complementarily and by the fall of the power supply voltage on this higher side, the output of the active elements is set to a predetermined level, so that in the deep standby mode, the power consumption can be further reduced.

More specifically, the circuit block on the side of this lower power supply voltage is the reference voltage generating circuit that generates a plurality of reference voltages by resistively dividing the generated reference voltage by the resistance block and is the reference voltage selector that selectively outputs the plurality of reference voltages according to the gradation data indicating the gradation of the pixels. The active elements performing on-off operation complementarily are active elements of the switch circuits that switch the polarity of the generated reference voltage by supplying the output to the resistance block and switching the terminal voltage of the resistance block by one processing result. Therefore, for example, as to the digital-analog conversion processing relating to line inversion, the power consumption in the deep standby mode can be further reduced.

Furthermore, the circuit block on the side of the lower power supply voltage is the drive circuit that switches the electrode potential of the storage capacitors each provided in a pixel, and the active elements performing on-off operation complementarily are active elements which switch the electrode potential of these storage capacitors. Therefore, as to the switching of the electrode potential of the storage capacitors, the power consumption in the deep standby mode can be further reduced.

Furthermore, the circuit block on the side of the lower power supply voltage is the drive circuit that switches the electrode potential of the liquid crystal cells, and the active elements performing on-off operation complementarily are active elements which switch the electrode potential of these liquid crystal cells. Therefore, as to switching of the electrode potential of the liquid crystal cells, the power consumption in the deep standby mode can be further reduced.

Furthermore, the circuit block on the side of the higher power supply voltage relating to the drive of these active elements is provided with the first inverter which operates by the first power supply voltage of 6V to output the first processing results, the second inverter which outputs the output of the first inverter to the second circuit block, and the power supply switching circuit 46 which, by the fall of the first power supply voltage, switches the power supply voltage of the second inverter from the first power supply voltage to the second power supply voltage which is 3V. Further, the input level of the second inverter is set by the level setting circuit 47 to hold the output of the active elements at a predetermined level, so that the output level of the active elements can be set variously not to cause various inconveniences in the circuit blocks at the latter stage, which can prevent various inconveniences and reduce the power consumption.

Producing the above-described first power supply voltage in the DC-DC converter which is a built-in power supply circuit can simplify the external configuration of the liquid crystal display apparatus.

(4) Other Embodiments

In the above-described embodiment, in the buffer circuits, the case where the power supply voltage of the inverter at the last stage is switched to 3V and this inverter input is set by the level setting circuit is described. However, the present invention is not limited to this, and for example, various techniques such as a case where the level of this inverter output is directly set by the level setting circuit can be applied as level setting methods.

Furthermore, in the above-described embodiment, the case where the operation is performed by 6V and 3V is described, the present invention is not limited to this, but can be widely applied to a case where the operation by power supply voltages of a plurality of systems is performed.

Furthermore, in the above-described embodiment, in the liquid crystal display apparatus, although the case where the processing results from the circuit block of the different power supply voltage in the circuits blocks relating to the digital-analog conversion processing and the precharge processing are inputted and processed is described. However, the present invention is not limited to this and can be widely applied, for example, to a case where in the shift register circuit or the like, the gradation data is transmitted and received between circuit blocks of different power supply voltages, or the like.

Furthermore, in the above-described embodiment, although the case where the present invention is applied to the flat display apparatus composed of the TFT liquid crystal in which the display unit and the like are formed on the glass substrate is described. However, the present invention is not limited to this and can be widely applied to various types of a flat display apparatus such as various types of liquid crystal display apparatus including a CGS (Continuous Grain Silicon) liquid crystal or the like and further an EL (Electro Luminescence) display apparatus. Furthermore, the present invention is not limited to such flat display apparatus, but can be widely applied to various integrated circuits composed of TFT or the like.

INDUSTRIAL APPLICABILITY

The present invention can be applied, for example, to a liquid crystal display apparatus in which drive circuit is formed integrally on an insulating substrate.

Description of Reference Numerals

1, 2 . . . electronic circuit, 3, 4, 41A, 41B, 50, 63, 64, 67, 68 . . . buffer circuit, 5, 31 . . . reference voltage generating circuit, 6, 6A, 6B, 7, 7A, 7B, 32, 32A, 32B, 33, 33A, 33B, 60, 60A, 60B, 61, 61A, 61B, 65, 65A, 65B, 66, 66A, 66B . . . switch circuit, 8 . . . resistance block, 11 . . . liquid crystal display apparatus, 12 . . . liquid crystal cell, 13, Q1 to Q8 . . . transistor, 14 . . . storage capacitor, 16 . . . display unit, 17 . . . horizontal drive circuit, 18 . . . vertical drive circuit, 19 . . . timing generating circuit, 20 . . . shift register, 21 . . . digital-analog conversion circuit, 22 . . . buffer circuit unit, 23 . . . CS drive circuit, 24 . . . VCOM drive circuit, 25 . . . DC-DC converter, 31 . . . reference voltage generating circuit, 35 . . . reference voltage selector, 46 . . . power supply switching circuit, 47 . . . level setting circuit, 48 . . . inverter, 49 . . . level shift circuit

The invention claimed is:

1. A flat display apparatus in which a display unit formed by arranging pixels in a matrix and a drive circuit driving the display unit are formed integrally on a substrate, characterized in that:

the drive circuit has a first circuit block operating by a first power supply voltage and a second circuit block operating by a second power supply voltage, which is lower than the first power supply voltage, for processing a processing result by the first circuit block;

the second circuit block receives an input of the processing result of the first circuit block at an active element performing on-off operation complementarily; and the first circuit block has a level setting circuit for setting a level of the processing result so as to hold an output of the active element at a predetermined level by a fall of the first power supply voltage, the first circuit block has a first inverter operating by the first power supply voltage, a second inverter for outputting the processing result based on the output of the first inverter to the second circuit block, and a power supply switching circuit for switching a power supply voltage of the second inverter from the first power supply voltage to the second power supply voltage by a fall of the first power supply; and the level setting circuit holds the output of the active element at a predetermined level by setting of an input level of the second inverter.

2. The flat display apparatus according to claim 1, characterized in that:

the second circuit block is a reference voltage generating circuit for generating a plurality of reference voltages by resistively dividing a reference voltage by a resistance block, and a reference voltage selector for selectively outputting the plurality of reference voltages according to gradation data showing gradation of the pixels; and the active element performing on-off operation complementarily is an active element of a switch circuit for switching a polarity of the generated reference voltage by outputting the output to the resistance block to switch a terminal voltage of the resistance block according to the processing result.

3. The flat display apparatus according to claim 1, characterized in that:

the second circuit block is a drive circuit for switching electrode potential of a storage capacitor provided in each of the pixels; and the active element performing on-off operation complementarily is an active element for outputting the output to the storage capacitor to switch the electrode potential according to the one processing result.

4. The flat display apparatus according to claim 1, characterized in that:

the second circuit block is a drive circuit for switching electrode potential of liquid crystal cells of the pixels; and the active element performing on-off operation complementarily is an active element for outputting the output to the liquid crystal cells to switch the electrode potential according to the processing result.

5. The flat display apparatus according to claim 1, characterized by comprising:

a power supply circuit for generating a power supply by the first power supply voltage from a power supply by the second power supply voltage, wherein the power supply by the second power supply voltage is supplied externally.

* * * * *